United States Patent [19]

Geen

[11] Patent Number: 5,394,241
[45] Date of Patent: Feb. 28, 1995

[54] MULTIPLE AXIS RING LASER GYROSCOPE WITH LONGITUDINAL EXCITATION

[75] Inventor: John A. Geen, Wrentham, Mass.

[73] Assignee: British Aerospace Public Limited Company, London, England

[21] Appl. No.: 283,434

[22] Filed: Dec. 12, 1988

[30] Foreign Application Priority Data

Dec. 10, 1987 [GB] United Kingdom ............ 8728829

[51] Int. Cl.⁶ .................... G01B 9/02; H01S 3/083
[52] U.S. Cl. .................... 356/350; 372/82; 372/94; 372/107
[58] Field of Search .......... 356/350; 372/82, 94, 372/107

[56] References Cited

U.S. PATENT DOCUMENTS

| | | |
|---|---|---|
| 3,748,594 | 7/1973 | Pugh . |
| 3,772,611 | 11/1973 | Smith ............... 372/94 X |
| 4,392,229 | 7/1983 | Hostetler ............ 356/350 X |
| 4,596,018 | 6/1986 | Gruber et al. ......... 372/82 X |
| 4,616,929 | 10/1986 | Bernelin et al. ....... 372/94 X |
| 4,620,306 | 10/1986 | Sutter, Jr. .......... 372/82 X |

FOREIGN PATENT DOCUMENTS

| | | |
|---|---|---|
| 0040004 | 11/1981 | European Pat. Off. . |
| 0201854 | 11/1986 | European Pat. Off. . |
| 0207455 | 1/1987 | European Pat. Off. . |
| 8700428 | 7/1987 | France . |
| 1103439 | 2/1968 | United Kingdom . |
| 1196785 | 7/1970 | United Kingdom . |
| 2006456 | 5/1979 | United Kingdom . |
| 2126777 | 3/1984 | United Kingdom . |

Primary Examiner—Stephen C. Buczinski
Attorney, Agent, or Firm—Nixon & Vanderhye

[57] ABSTRACT

A ring laser gyroscope in which RF excitation is used to cause gas discharge as opposed to DC excitation which is used in conventional ring laser gyroscopes. External surfaces of the body of the ring laser gyroscope are metallized to form electrodes and an RF signal is capacitively coupled to gas reservoirs forming part of the lasing cavities.

9 Claims, 5 Drawing Sheets

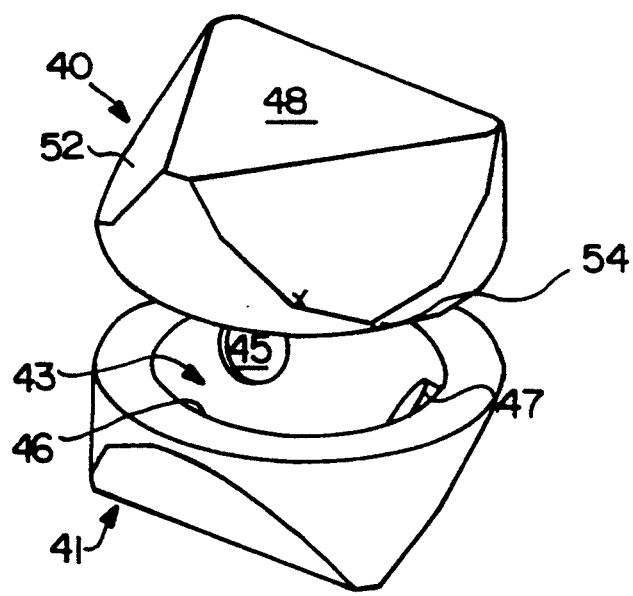
FIG. 4
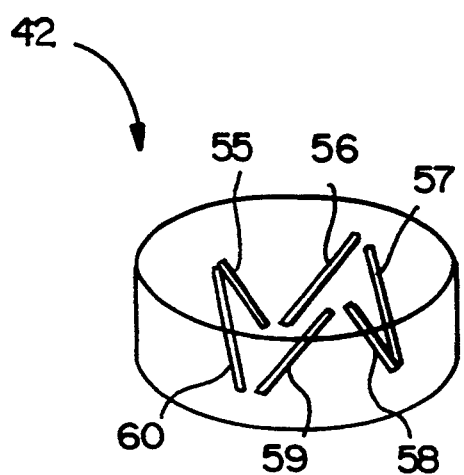
FIG. 5
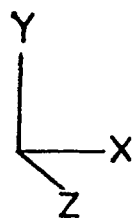

MULTIPLE AXIS RING LASER GYROSCOPE WITH LONGITUDINAL EXCITATION

BACKGROUND OF THE INVENTION

1. Field of the Invention

The present invention relates to ring laser gyroscopes.

2. Discussion of Prior Art

Ring laser gyroscopes have one or more sensitive axes and for each axis there is provided a gas-filled-cavity disposed in a plane at right angles to the associated axis. Each cavity comprises a plurality of reflective surfaces, usually discrete mirrors, defining a polygonal path for two laser beams travelling in opposite directions in a closed loop around the cavity. The laser beams are regeneratively amplified at frequencies for which the path length equals an integral number of wave lengths.

A triaxial ring laser gyroscope is disclosed in UK Patent Number 2076213B which comprises three mutually orthogonal square cavities. The cavities are interconnected at the corners so that they share mirrors thus reducing the number of mirrors required to six. The cavities form a regular octahedron and are machined from a unitary block of dielectric material such as Zeredur. The starting geometry of the block is a cube which has at the centres of its faces the six vertices of the octahedron. The vertices are the locations of the six mirrors and the faces of the cube define the mirror mounting planes.

The cube is particularly convenient to manufacture to high accuracy and greatly facilitates the precision machining of the laser bores.

Large bores are ground from the octahedron vertices toward the centre of the block to form gas reservoirs. These reservoirs extend laser life by reducing the effect of the finite gas permeability of the block and electrodes.

Laser gyroscopes are conventionally excited by direct current applied between metal electrodes sealed into the cavities containing the laser gain medium, often a low pressure helium-neon gas mixture, to cause gas discharge and to initiate lasing. In the triaxial ring laser gyroscope disclosed in UK Patent Number 2076213B, the corners of the cube are machined off to form mounting faces for a cathode, dither spring and so on. For each of the three cavities, two additional bores are connected to the lasing path from the exterior of the block to form anode connections. The anodes have to be symmetrically positioned with respect to the cathode end a means has to be found to prevent anode to anode discharges.

In a ring laser gyroscope formed from a unitary block of dielectric material, gas-tight seals are required at each of the mirrors, at each electrode and at a gas-fill aperture.

Known ring laser gyroscopes of the type described above have several disadvantages.

The gas-tight seals are expensive to make properly, may be prone to leakage and may be a source of failure. The cathode structure has to be large if sputtering is not significantly to degrade the life of the laser. Further, the internal surface of the cathode needs to be specially processed which is an inconvenience and cost in manufacture.

Moreover, the discharge has to be split into two counter current paths which are carefully balanced if gas flow is not to give unacceptably large gyro drift errors. This requires careful design and precision machining of the cavity bores together with use of very precise, high voltage regulating electronics. Both are expensive and may leave significant residual gas flow errors.

Furthermore, it may be difficult to ensure that the discharge initiates in the correct gas path. This requirement places restrictions on the bore geometry which further reduces the available gain. In the case of a triaxial ring laser gyroscope formed from a unitary block and in which the cavities are interconnected, the problems are especially taxing. The difficulty is in establishing an electric field of sufficient strength to initiate discharge along the required gain bores without channelling plasma into bores where it is not required but nonetheless can sustain a discharge path.

Large value ballast resistors can be used in the laser current path to suppress plasma oscillations. However, the use of these mean that the laser gyroscope has to be run on even higher voltages. The resistors waste power and, because they must be in very close physical proximity to the block in order to be effective, they are a source of thermally driven gyro error.

SUMMARY OF THE INVENTION

It is an object of the present invention to provide a ring laser gyroscope which is an improvement on known ring laser gyroscopes with regard to the problems outlined above.

According to the present invention we provide a ring laser gyroscope comprising a body defining at least one cavity and comprising reflective surfaces positioned so as in use to define a polygonal path for two coaxial laser beams travelling in opposite directions around the cavity wherein electrode means are provided so that an electrical excitation signal can be coupled capacitively to the cavity through the walls defining the cavity.

In the present invention, the ring laser gyroscope is conveniently made a part of a radio frequency resonant circuit which, before discharge is initiated, has a comparatively high Q factor and automatically creates the higher voltage needed to strike the discharge. Subsequently, the discharge loads the resonant circuit, reducing its Q factor, and reduces the voltage to just that level necessary to dissipate the RF energy supplied.

A substantial advantage of the present invention is that, since all the bores are filled with plasma, there is no possibility of a misdirected discharge. Further, gain bores of the same physical size are of identical size and disposition with respect to the electric field and so share the current equally. In fact, equality of gain bore currents and constancy of laser excitation are far less critical than in a DC excited gyro because DC excitation involves ion flow which Doppler shifts the laser beam and causes bias errors. In an RF field there is no net ion flow, the only consideration is that the power dissipation in the gain bores should not become so imbalanced as to cause a thermally driven gas flow.

Furthermore, the very large voltages necessary to initiate discharge in conventional ring laser gyroscopes are not needed at radio frequency and the running voltages are also somewhat lower, for four reasons. Firstly, discharges occur more readily when the voltage varies rapidly. Secondly, there is no initial inhibition as a result of surface charges which tend to accumulate on the electrically insulating body of a conventional ring laser gyroscope. Thirdly, there is no space charge associated with radio frequency discharges therefore there are no voltage drops corresponding to the anode and cathode drops when DC excitation is used. Fourthly, the inductance and negative resistance associated with ionic inertia in a DC discharge are much reduced and become part of the overall resonant circuit in an RF discharge. Consequently, ballast resistors are not needed to suppress parasitic oscillations and the penalties detailed earlier are not incurred.

The much lower running voltages ease insulation requirements, improve reliability and reduce power consumption.

A ring laser gyroscope according to the present invention can be of much simpler construction than a conventional gyroscope because no anode or cathode bores or anode or cathode components are required. Neither are additional bores to form gas reservoirs required. Thus reductions in cost and size can be achieved.

Importantly, a ring laser gyroscope according to the present invention requires a lower number of gas seals than known gyroscopes since there are no longer DC electrodes requiring seals.

Preferably, the electrode means comprise an electrically conductive coating on an external surface of the ring laser gyroscope body. The electrode means preferably comprise two electrodes which are orientated so that the electrical field has a substantial component along the gain bores axes.

Advantageously, the electrode means comprise at least two electrodes which, in use, are driven in antiphase. This feature enables the peak voltage required to be halved thus easing insulation requirements and improving reliability.

Preferably, the ring laser gyroscope comprises a reservoir for gas adjacent one or more electrodes of the electrode means.

In an embodiment to be described, the ring laser gyroscope body is formed from a unitary block of dielectric material which is bored to define the or each cavity and which comprises a plurality of relatively small diameter bores which, in use, form gain bores and a plurality of relatively large diameter bores which, in use, form gas reservoirs.

In another embodiment to be described, the ring laser gyroscope body is in modular form and comprises a first module comprising reflective surfaces defining at least two corners of the polygonal path and a second module comprising at least one gain bore wherein a gas reservoir is provided by a vacancy in the first module.

In an embodiment to be described, a ring laser gyroscope comprises a cavity defining a rectangular path for two laser beams travelling in opposite directions. The cavity may comprise two parallel gain bores and the electrode means may comprise two electrodes placed opposite the ends of the gain bores. The ring laser gyroscope may comprise cavities defining two mutually orthogonal rectangular paths.

In an embodiment to be described, a ring laser gyroscope comprises a plurality of cavities defining a like plurality of mutually orthogonal polygonal paths for oppositely travelling pairs of laser beams and configured so that each cavity shares at least one corner with another cavity whereby the cavities are interconnected and wherein the electrode means comprises two electrodes placed on opposite surfaces of the ring laser gyroscope body.

In one embodiment to be described, the ring laser gyroscope body is formed from a unitary cubic block of dielectric material wherein said opposed surfaces are obtained by removing diagonally opposed corners of the cubic block. In that embodiment, two opposed bores in each cavity are designed as gas reservoirs thereby providing two opposed generally triangular gas reservoirs.

Also in that embodiment, a dither ring is mounted equatorially relative to each one of the plurality of cavities and is driven at chassis potential whilst the two electrodes are driven in antiphase.

BRIEF DESCRIPTION OF THE DRAWINGS

Particular embodiments of the present invention will now be described, by way of example, with reference to the accompanying drawings in which:

FIG. 4 is a perspective view of two components of the triaxial ring laser gyroscope of FIG. 3;

FIG. 5 is a perspective view of a third component of the triaxial ring laser gyroscope of FIG. 3;

DETAILED DISCUSSION OF PREFERRED EMBODIMENT

Figure 1:
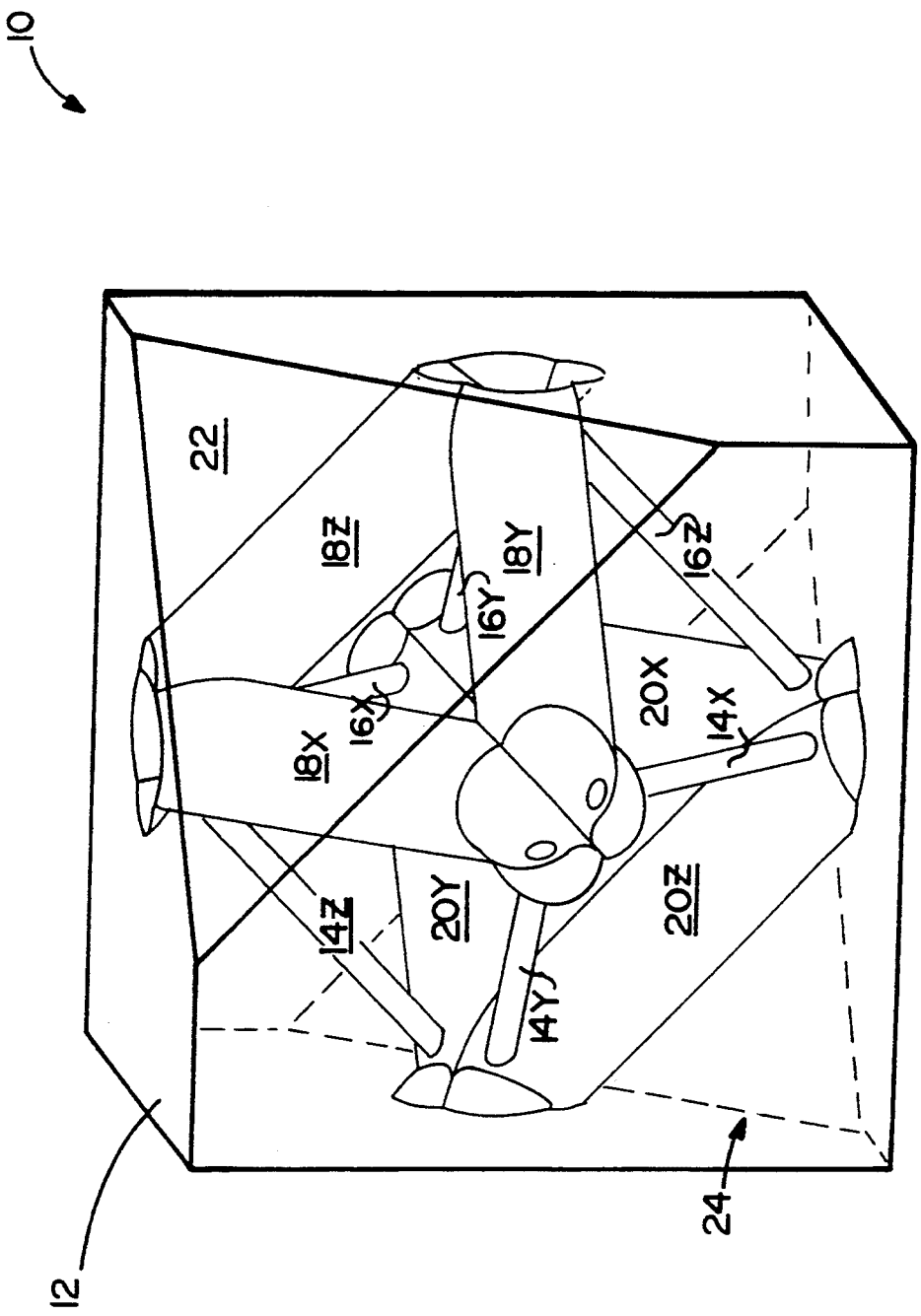
FIG. 1 is a perspective view of a triaxial ring laser gyroscope according to the present invention.

Referring to FIG. 1, a triaxial ring laser gyroscope indicated at 10 is formed from a cubic block 12 of a dielectric material such as Zerodur, which is a transparent material. Bores are drilled between the centres of the faces of the cubic block 12 to form three square mutually orthogonal cavities designated X, Y and Z. The three cavities X, Y and Z are each orthogonal to the axis of sensitivity to which they relate. Each of these cavities comprises two opposed bores e.g. 14X, 16X, of relatively small diameter e.g. 2 mm, which are gain bores and two opposed bores e,g. 18X and 20X of relatively large diameter e.g. 15 mm, which are reservoir bores. The length of each gain bore may be approximately 38 mm. It can be seen that the reservoir bores 18X, 18Y and 18Z and 20X, 20Y and 20Z form two opposed triangular gas reservoirs.

The mirrors of the ring laser gyroscope 10 are not shown in FIG. 1 but there would be a mirror at each cavity corner, making six mirrors in all. Of these, there are three path length control mirrors which are movable so as to control the path lengths of the associated cavities and three output mirrors each of which allows a portion of the counter-rotating laser beam to leave the cavity for measurement purposes. Each of the mirrors has to provide a gas-tight seal at the cavity corners. Further details of the mirrors are given in our UK Patent Number 2076213B.

Two opposed corners of the cubic block 12 are machined away symmetrically to provide surfaces which can be metallised to form electrodes 22 and 24. One such electrode 22 is clearly visible in FIG. 1 and the other electrode 24 is indicated in dotted lines. It will be understood that, in practice, further portions of the cubic block 11 will be machined away to reduce weight and volume.

No reservoirs are drilled towards the centre of the block 11 as these would short circuit the gain bores 14X, 14Y and 14Z and 16X, 16Y and 16Z at radio frequency, even in the presence of residual dielectric material in the centre of the block. The only other bore (not shown) would be a connection to enable the cavities to be filled with gas and for gettering. Thus the number of gas seals required is greatly reduced in comparison to a conventional DC excited ring laser gyroscope.

A well known problem associated with ring laser gyroscopes is the phenomenon of lock-in. One way of overcoming this problem is to dither the ring laser gyroscope so as to impart rotation to the or each cavity. A dither ring, at chassis potential, may be placed around the block 11 of FIG. 1 in an equatorial position i.e. in a plane parallel to the two electrodes and mid-way between them. Consequently, the dither axis is the line which would join the two corners machined off to form the electrode surfaces. This axis is symmetrically disposed with respect to the three cavities, X, Y and Z. The dither spring may be of the vibrating counter-inertia type.

In use, the cavities X, Y and Z are filled with gas containing a lasant and an RF signal is applied to the electrodes. In use, the two electrodes 22 and 24 each form one electrode of a coupling capacitor, the other electrode being the adjacent triangular reservoir formed by the reservoir bores 18X, 18Y and 18Z and 20X, 20Y and 20Z respectively. It is not necessary to metallise the reservoir bores since, in use, these are filled with plasma which acts as an electrical conductor. The operating frequency is constrained by several factors and is desirably in the range 10 to 100 MHz and preferably in the range of 20 to 30 MHz. An advantage of an equatorial dither ring is that it alleys the electrodes to be driven in antiphase with respect to the chassis thereby halving the peak voltage required with respect to the chassis and easing insulation requirements as well as improving reliability. However, another practical alternative would be to mount a dither spring coplanar with one of the electrodes and to make that electrode chassis potential and to drive the other electrode with respect to the chassis.

Another method for overcoming the problem of lock-in is to use magnetic mirrors in place of dither in which case either of the drive methods mentioned above is applicable although antiphase driving is preferred. Information regarding such magnetic mirrors is well-known in the art and can be obtained from published UK Patent Application No. 2006456A.

Figure 2:
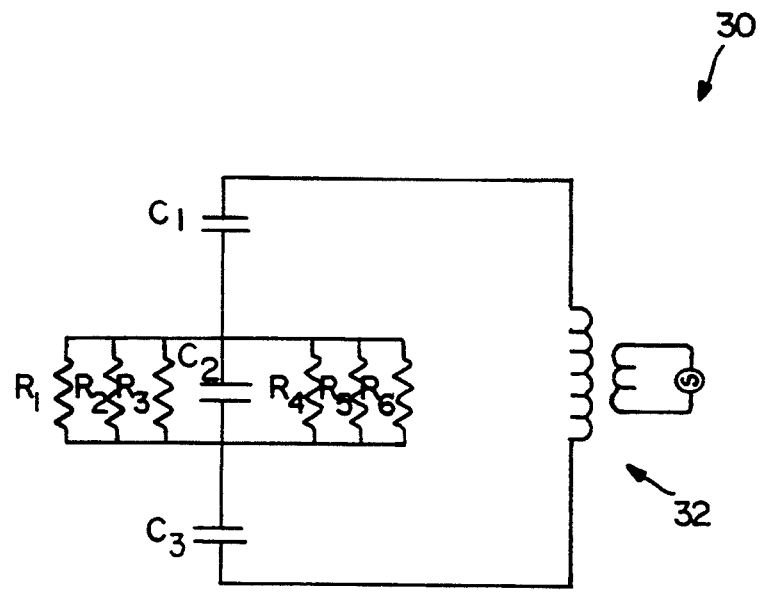
FIGS. 2 and 2a are alternative circuit diagrams corresponding to the embodiments shown in FIG. 1.

Referring to FIG. 2, a radio frequency resonant circuit 30 is shown in which a radio frequency signal is supplied via a transformer 32 to three capacitors C1, C2 and C3 connected in series. Resistors R1-R6 are connected in parallel with the capacitor C2. The circuit 30 represents the ring laser gyroscope shown in FIG. 1. The electrodes 22 and 24 form the outer plates of the capacitors C1 and C3. The other plates of the capacitor C1 and C3 are formed by the plasma in the triangular gas reservoirs formed by the reservoir bores 18X, 18Y and 18Z and 20X, 20Y and 20Z respectively. The capacitor C2 represents the capacitance of the block 12 and the resistors R1-R6 represent the discharging gain bores 14X, 14Y, and 14Z and 16X, 16Y and 16Z respectively.

Thus, in use, the ring laser gyroscope 10 forms part of a radio frequency resonant circuit. Before the gas in the cavities 12X, 12Y and 12Z is caused to discharge, the circuit 30 has a relatively high Q factor and automatically creates the higher voltage needed to strike the discharge. Subsequently, the discharge loads the resonant circuit 30, reducing its Q factor and reduces the voltage to a level just sufficient to dissipate the radio frequency energy which is supplied. In other words, as the gain bores strike they take more current and dissipate power until an equilibrium is reached between the power being supplied and that being dissipated in the gain bores.

Given a gain bore length of 38 mm, at about 3 volts per mm rms gain bore drop, this gives about 160 volts peak bore voltage. The gain bores 14X, 14Y and 14Z and 16X, 16Y and 16Z are shunted by the block capacitance (capacitor C2 in FIG. 2) which can be approximated by a parallel plate capacitor with triangular plates in the planes of the reservoir bore axes and having a Zeredur glass dielectric.

The frequency of the resonant circuit 30 will be unstable with temperature. Therefore, the simplest way of providing the drive is to construct a self-oscillating system with the resonant circuit as the frequency determining element as is well known in the art of resonant circuit design.

If the electrodes are not to be driven in antiphase with respect to the chassis it may be more convenient to use a series end-fed resonator circuit of the type well known in radio frequency technology.

Figure 2A:
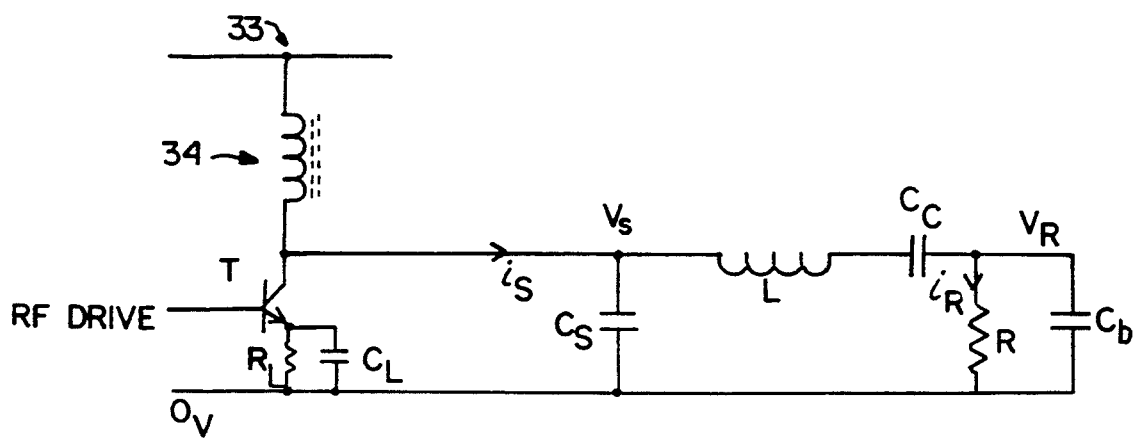

Such a circuit indicated at 30a is shown in FIG. 2a in which a single resister R is shown representing resistors $R_1$-$R_6$ in FIG. 2. Capacitor $C_b$ represents the capacitance of the ring laser gyroscope block, typically 4pF, and capacitor $C_c$ represents the series capacitances of each metallised electrode and adjacent reservoir bores, typically 6pF.

A supply, typically $+15$ V, is indicated at 33 and is fed via an rf choke 34. An rf drive signal is supplied to a transistor T, the emitter of which is connected to the 0V line via a resistor $R_L$ and a capacitor $C_L$ for local decoupling.

$C_S$ is a source capacitor representing a low voltage discrete component plus the collector capacitance of the transistor T.

If the tank circuit $C_S$, L, $C_C$, $C_b$ and R is at resonance, the reactance of the inductor L cancels that of the capacitances and the impedance presented to the transistor collector is resistive with value $$r = V_s/i_s \qquad (1)$$

Also, $V_s i_s = V_R i_R$, the only power dissipation of the tank circuit being in the bores and dielectric loss. Alternatively, this can be expressed as $$r = R(V_s/V_R)^2 \qquad (2)$$

If the Q is much greater than one, then the circulating current in the tank coil L is much larger than either $i_R$ or $i_S$ and one can write
$V_s x jwC_s \simeq V_R jwC_b$ for the value of that current.
Therefore
$$V_R \simeq V_s (C_s/C_b) \qquad (3)$$

or using expressions (1), (2) and (3), $$V_R \simeq i_s R \ (C_b/C_c) \qquad (4)$$

Expression (3) illustrates that $C_s$ can be chosen to given the high voltage necessary for the gas discharge even though the input voltage $V_s$ is quite modest. Typically $C_s$ would be 20 times $C_b$.

Expression (4) illustrates that: for constant current feed, the voltage across the bores increases with the effective loss resistance. Consequently, when the bores are not discharging, so that R is that large value corresponding to the dielectric loss of $C_b$, $V_R$ becomes a large voltage and initiates the discharge. On the other hand, when the bores are discharging and presenting a smaller parallel resistance, the value of $V_R$ is reduced to its working value.

In reality the transistor is not a perfect current source, but its impedance can be made high enough by straightforward methods for it to be near enough a current source for practical purposes.

Figure 3:
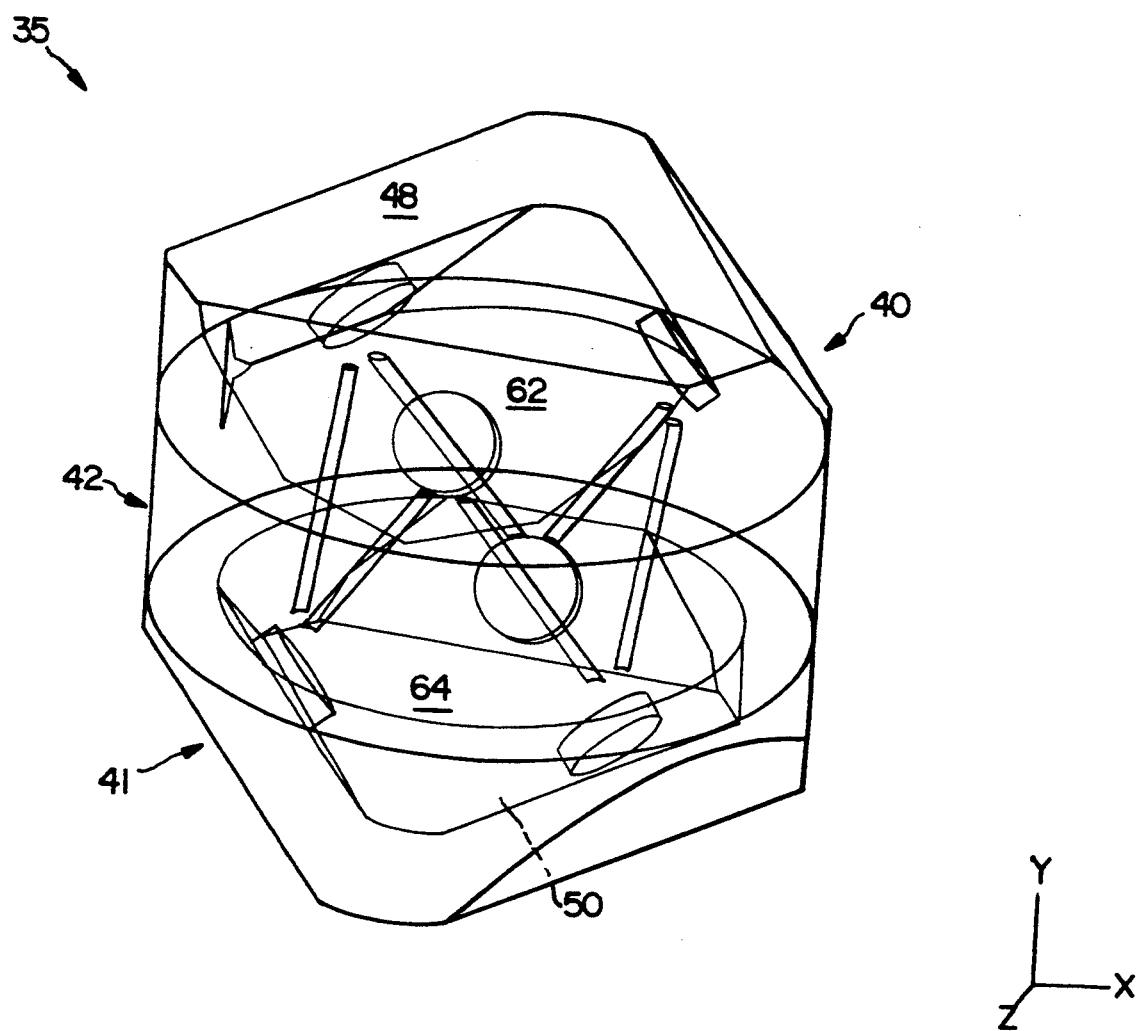
FIG. 3 is a perspective view of components of another embodiment of a triaxial ring laser gyroscope according to the present invention.

FIGS. 3 to 5 relate to a modular triaxial ring laser gyroscope 35. In use, the modular triaxial ring laser gyroscope 35 operates in a similar manner to the triaxial ring laser gyroscope described with reference to FIG. 1 and the resonant circuit diagram of FIG. 2 also applies.

The triaxial ring laser gyroscope 35 comprises two mirror modules 40, 41 and a gain bore module 42. These modules 40, 41 and 42 are all made from a material having a low coefficient of thermal expansion such as Zerodur or silica or a material which can be cast inexpensively such as Pyrex (Registered Trade Mark).

Referring to FIG. 4 each of the mirror modules 40 and 41 comprises a generally hemispherical casing which defines a recess 43 in which are mounted three mirrors 45, 46 and 47. The mirrors 45–47 are mounted in mutually orthogonal relationship. The mirrors 45–47 may be made of the same material as the casing of the mirror modules 40 and 41 and are coated to provide a mirror of the required quality.

The top and bottom parts of the mirror modules 40 and 41 are flattened to provide surfaces which are metallised to form electrodes 48 and 50. In practice, a readout prism (not shown) would be mounted on face 52. There would be one readout prism for each cavity of the ring laser gyroscope 35. An alignment mark 54 is provided to aid in assembly of the modular gyroscope 35.

Referring to FIG. 5, gain bore module 42 is generally cylindrical in shape and comprises six gain bores 55–60 orientated as shown. The pairs 55, 58 and 57, 60 and 56, 59 of the gain bores are parallel.

FIG. 3 shows the mirror modules 40 and 41 and the gain bore module 42 assembled to form a modular triaxial ring laser gyroscope with the gain bore module 42 being sealed in a gas-tight manner between the mirror modules 40 and 41. The mirrors 45–47 in each of the mirror modules 40 and 41 are aligned with the gain bores 55–60 to define three square mutually orthogonal cavities in a similar manner to the triaxial ring laser gyroscope shown in FIG. 1. However, in this embodiment, the vacancies indicated at 62 and 64 defined by the recesses 43 in the mirror modules 40 and 41 and the flat faces of the gain bore module 42 advantageously provide gas reservoirs adjacent to the electrodes 48 and 50.

Figure 6:
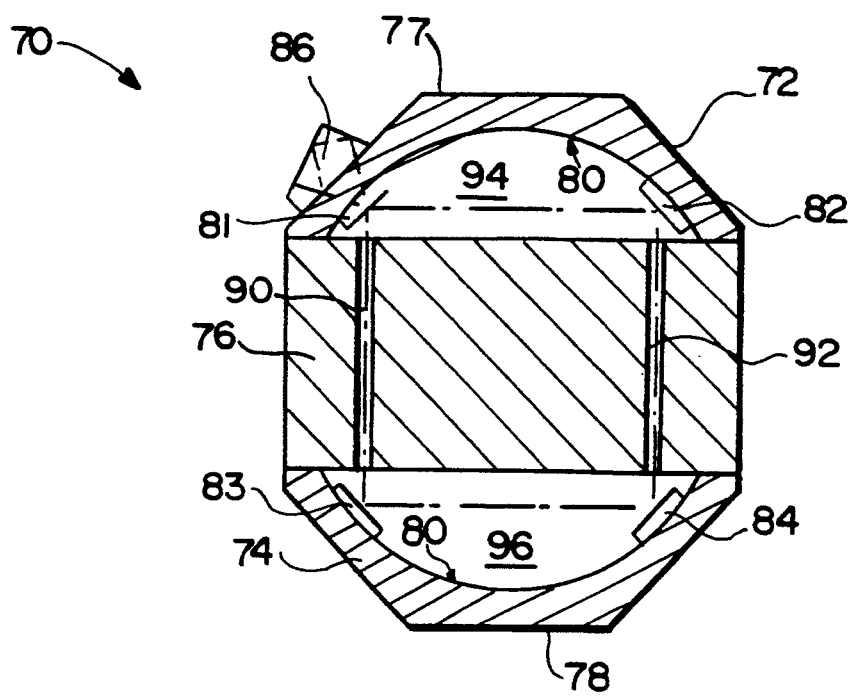
FIG. 6 is a modular single axis rings laser gyroscope according to the present invention.

Referring now to FIG. 6, a single axis ring laser gyroscope 70 is shown which comprises two mirror modules 72 and 74 and a gain bore module 76. The modules 72, 74 and 76 are each formed from a dielectric material having low coefficient of thermal expansion. Each of the mirror modules 72 and 74 comprises a flat face which is metallised to form electrodes 77 and 78. The inner surface 80 of each of the mirror modules 72 and 74 is curved and has mounted thereon two mirrors 81, 82 and 83, 84 respectively. The mirrors in each pair 81, 82 and 83, 84 are in mutually orthogonal relationship. The mirrors 81, 82 are planar and the mirrors 83, 84 are curved. A readout prism is indicated at 86. A gas-fill tube is (not shown) included on the mirror module 74.

The gain bore module 76 is solid except for two parallel gain bores 90 and 92 of equal length.

When assembled, the interfaces between the mirror modules 72 and 74 and the gain bore module 76 form gas-tight seals. In side view the ring laser gyroscope 70 is generally flat. The curved inner surfaces 80 of the mirror modules 72 and 74, together with the flat top and bottom faces of the gain bore module 76, define two gas reservoirs 94 and 96.

On the application of a suitable RF excitation signal to the electrodes 77 and 78, a discharge is induced in the gas reservoirs 94 and 96 which results in two oppositely travelling laser beams each of which follows the square path indicated in dotted lines in FIG. 6.

In a manner a analogous to that described with regard to the triaxial ring laser gyroscope of FIG. 1, the electrodes 77 and 78 act as plates of coupling capacitors, the other plates of which are formed by the plasma in the gas reservoirs 94 and 96.

It is envisaged that a biaxial modular ring laser gyroscope could be formed if the mirror modules 72 and 74 in FIG. 6 were generally hemispherical each having two pairs of mirrors in mutually orthogonal relationship and if the gain bore module 76 were generally cylindrical and comprised two further gain bores in parallel to the first two. In such a biaxial ring laser gyroscope there would be two mutually orthogonal square cavities having no common corners so that eight mirrors would be required.

It can be seen that modular ring laser gyroscope designs are particularly suited for use in a ring laser gyroscope according to the present invention because the gas reservoirs required near the electrodes can conveniently be provided by vacancies in the mirror modules.

Attention is directed to our co-pending patent application of even date also entitled Ring Laser Gyroscopes in which further details of the modular configurations are included.

The following table contrasts the number of gas-tight seals required in a ring laser gyroscope according to the present invention in comparison with known ring laser gyroscopes:

| DC EXCITED RLG | | RF EXCITED RLG | | | |
| --- | --- | --- | --- | --- | --- |
| SINGLE AXIS RLG WITH 4 MIRRORS (MONOBLOCK) | TRIAXIAL RLG WITH 6 MIRRORS (MONOBLOCK) | SINGLE AXIS RLG WITH 4 MIRRORS | | TRIAXIAL RLG WITH 6 MIRRORS | |
| | | MONOBLOCK | MODULAR | MONOBLOCK | MODULAR |
| 8 | 10 | 5 | 3 | 7 | 3 |

It can be seen that significant reductions in the number of gas-tight seals required are obtained in accordance with the present invention which obviates the need for electrodes which communicate directly with the cavity of a ring laser gyroscope. The most significant reductions are obtained when modular designs are used.

I claim:

1. A multiple axis ring laser gyroscope comprising:
   a body made of dielectric material and having portions defining a series of passages through said body;
   a plurality of reflective members fixed to said body, said plurality of reflective members and said passages comprising means for defining a plurality of like closed polygonal paths for respective laser beams to pass therearound;
   a gas located within said passages in which an electrical discharge may be induced to excite said laser beams;
   at least two electrodes fixed to said body at opposite sides of said body; and
   radio-frequency signal generating means, coupled to said electrodes, for inducing said discharge capacitively through said body;
   said polygonal paths including respective limbs which all extend symmetrically and generally in the same direction between said two electrodes, said polygonal paths, said at least two electrodes and said radio frequency signal generating means comprising a means for inducing longitudinal excitation of said gas in said passages.

2. A ring laser gyroscope according to claim 1 wherein the electrode means comprise an electrically conductive coating.

3. A ring laser gyroscope according to claim 1 comprising a reservoir for gas adjacent to one or more electrodes of said at least two electrodes.

4. A ring laser gyroscope according to claim 1 in which the ring laser gyroscope body is formed from a unitary block of dielectric material which is bored to define said polygonal path and which comprises a plurality of relatively small diameter bores comprising gain bores and a plurality of relatively large diameter bores comprising gas reservoirs.

5. A ring laser gyroscope according to claim 1 in which the ring laser gyroscope body is in modular form and comprises a first module comprising reflective surfaces defining at least two corners of at least one of said polygonal paths and a second module comprising at least one gain bore wherein a gas reservoir is provided by a vacancy in the first module.

6. A ring laser gyroscope according to claim 1 comprising a plurality of cavities defining a like plurality of mutually orthogonal polygonal paths for oppositely travelling pairs of laser beams and configured so that each cavity shares at least one corner with another cavity whereby the cavities are interconnected and wherein said at least two electrodes comprises two electrodes placed on opposed surfaces of the ring laser gyroscope body.

7. A ring laser gyroscope according to claim 6 in which the ring laser gyroscope body is formed from a unitary cubic block of dielectric material wherein said opposed surfaces are obtained by removing diagonally opposed corners of the cubic block.

8. A ring laser gyroscope according to claim 4 comprising three mutually orthogonal polygonal paths in which two opposed bores in each polygonal path are designed as gas reservoirs thereby providing two opposed generally triangular gas reservoirs.

9. A multiple axis ring laser gyroscope comprising:
   a body having at least one wall defining a cavity;
   reflective means for defining a polygonal path for two coaxial laser beams travelling in opposite directions in the cavity;
   electrode means, electrically coupled to said cavity through said at least one wall defining said cavity, for providing an electrical excitation signal; and
   electrical circuit, connected to said electrode means, for forming an electrical resonant circuit and for supplying an excitation signal to said electrode means, electrical characteristics of said resonant circuit being dependent upon the electrical charge between said electrode means and said body.

* * * * *